United States Patent Office 3,008,185
Patented Nov. 14, 1961

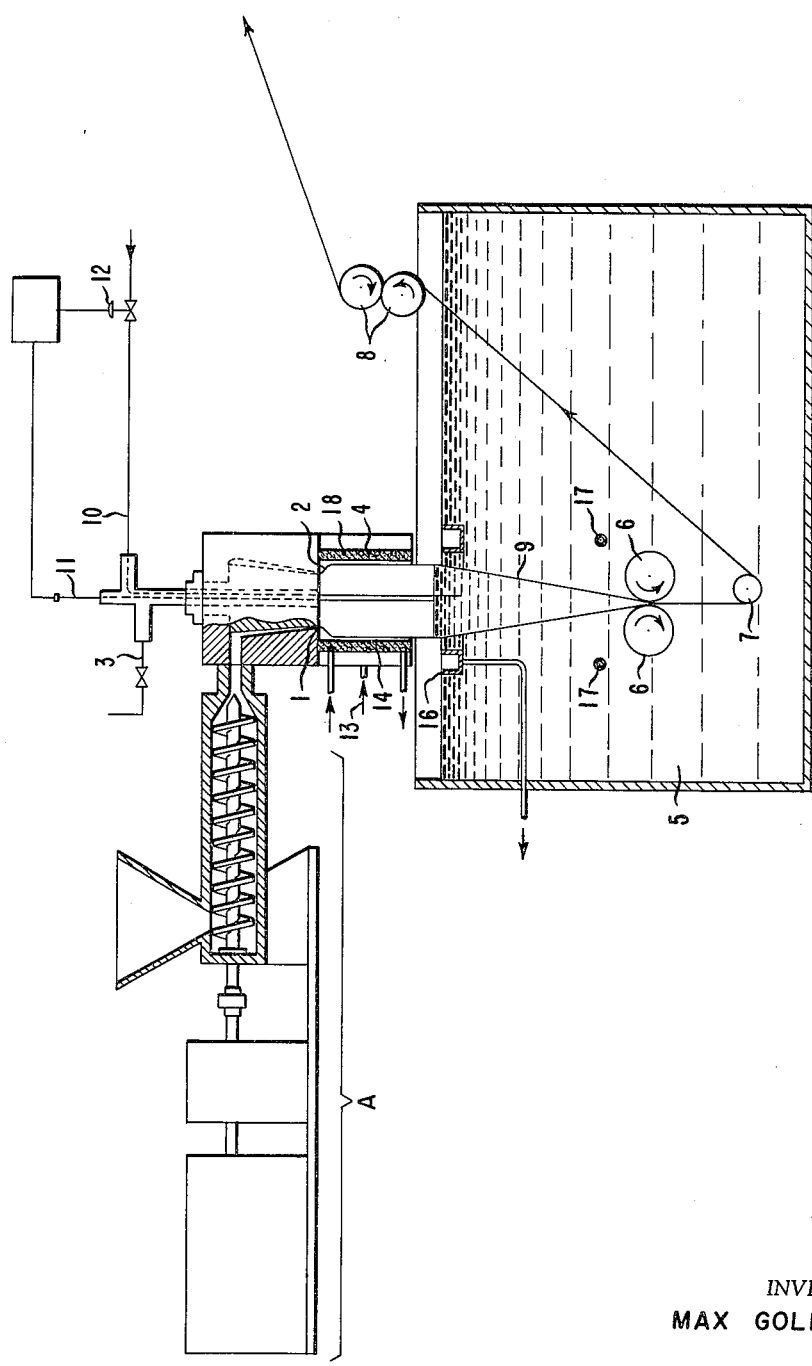

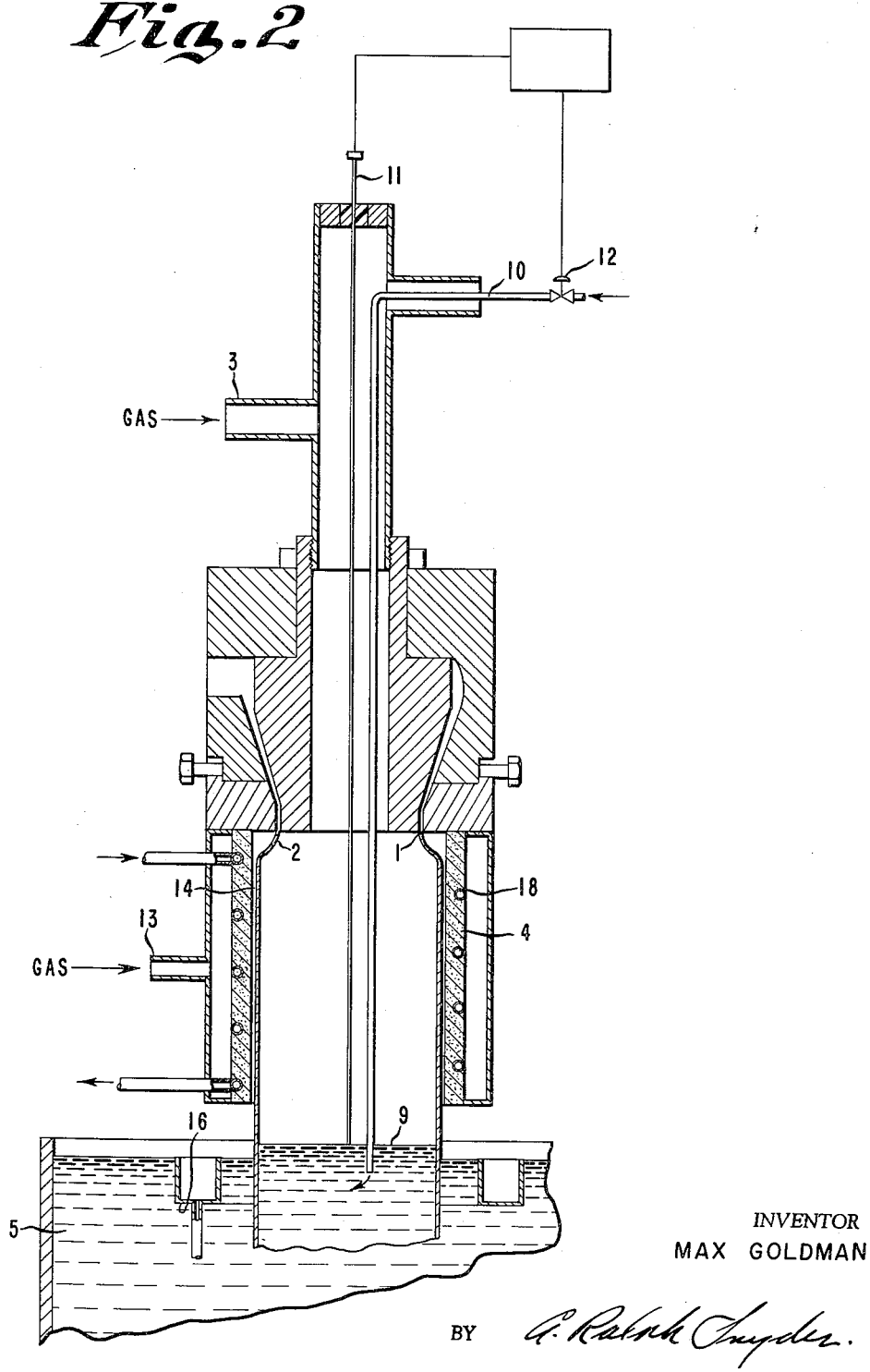

3,008,185
EXTRUSION PROCESS AND APPARATUS FOR FORMING TUBULAR FILM
Max Goldman, Tonawanda, N.Y., assignor to E. I. du Pont de Nemours and Company, Wilmington, Del., a corporation of Delaware
Filed Jan. 24, 1958, Ser. No. 710,998
5 Claims. (Cl. 18—14)

This invention relates to thermoplastic tubing and more particularly to an improved process and apparatus for extruding continuous tubing of organic thermoplastic materials. It has been proposed to rapidly quench freshly extruded tubing by passing the tubing downwardly into a quench bath of coolant, e.g., water. The tubing, in the distance between the extruder and the approximate surface of the quench bath, is maintained in the inflated state by a "bubble" of air, and in the bath a head of liquid is maintained in the tubing to the point where the quenched tubing is converged (flattened) between pinch rolls. While this quenching procedure does, for the most part, overcome the disadvantages of air cooling noted above, it is not altogether successful for the reason that is difficult, particularly at high extrusion rates, to maintain a stable bubble of air in the tubing, and bubble instability leads to poor convergence of the tubing and consequent wrinkling at the pinch rolls. Moreover, surface bath ripple and sub-surface bath movement incident to circulation of the quench bath (to maintain a constant temperature) tends to oscillate and hence place strains on the still-plastic tubing, and as a result quenched tubing having non-uniform wall thickness is obtained.

In the conventional manufacture of thin-walled tubing from organic thermoplastic materials by means of circular die extrusion, the tubing is extruded either vertically or horizontally. The extruded tubing is quenched while the tube is expanded in the transverse direction and drawn from the die in the longitudinal or machine direction. Quenching of the extruded tubing usually takes place by means of an air distributor located externally to the tubing surface. However, quenching by this method is slow, and as a result, circular die extrusion must take place at low temperatures and low extruder throughputs. Furthermore, in the case of many crystallizable thermoplastic materials, this slow rate of quenching results in a film having a substantial degree of crystallization and unbalanced physical properties, which is a distinct disadvantage when it is desired to later orient the film by stretching and/or rolling the film in two directions to substantially the same degree whereby to obtain a film having physical properties enhanced equally in both directions.

It is an object of this invention, therefore, to provide a satisfactory process for the rapid quenching of thin-walled tubing of organic thermoplastic material being melt-extruded from a circular die. Another object is to rapidly quench freshly melt-extruded thin-walled tubing of crystallizable organic thermoplastic material whereby the quenched tubing has substantially uniform dimensions and balanced physical properties in both the transverse and longitudinal (machine) directions of the tubing. Still another object is to provide improved apparatus for producing thin-walled tubing of organic thermoplastic material. The foregoing and additional objects will more clearly appear hereinafter.

These objects are realized by the present invention which, briefly stated, comprises continuously extruding molten organic thermoplastic material substantially vertically downwardly in the form of tubing of circular cross-section, continuously advancing said tubing substantially vertically downwardly through a zone of limiting cross-section, expanding said tubing in said zone to the limiting cross-section by the pressure of gas on the interior of the tubing while maintaining the temperature of the tubing above its stick temperature, and continuously advancing said tubing at a temperature above its stick temperature substantially vertically downwardly into a bath of liquid coolant maintained at a temperature effective to rapidly cool (i.e., quench) said tubing and maintaining a head of liquid in said tubing below the zone of limiting cross-section, the level of said head of liquid being adjusted to maintain the gas at a pressure effective to maintain the tubing in said zone of limiting cross-section at said limiting cross-section.

Although the process of the present invention is applicable to all organic thermoplastic materials capable of being melt-extruded, particular emphasis will be placed, in the description and examples to follow, on the treatment of those polymers which are readily obtainable in crystalline form. As examples of organic thermoplastic materials which are extrudable in accordance with the process of this invention there may be mentioned: polyethylene including linear polyethylene, copolymers of polyethylene, polyvinyl chloride, polyvinylidene chloride, polyvinylidene fluoride, polyoxymethylene resin, polystyrene, polyethylene terephthalate, copolymers of tetrafluoroethylene and perfluoropropene, as well as those crystallizable organic polymeric substances normally not capable of being melt-extruded to which sufficient quantities of appropriate solvent have been added to render them melt-extrudable.

The term, stick temperature, is the minimum temperature at which a sample of the polymer leaves a wet molten trail as it is stroked with moderate pressure across the smooth surface of a heated block of brass. In the case of polymers capable of being readily crystallized, the term crystalline melting point is analogous to the stick temperature and as such will be utilized in the description and examples to follow.

This invention will be further described with reference to the accompanying drawings wherein:
FIGURE 1 is a schematic sketch in the longitudinal section of a preferred arrangement of apparatus embodying the features of this invention, and
FIGURE 2 is an enlarged cross-sectional view of a portion of the apparatus illustrated in FIGURE 1.

Referring to FIGURE 1, illustrative of a preferred embodiment of this invention, molten thermoplastic material is extruded from a conventional melt-extrusion device, generally indicated by the legend A, through an annular die orifice 1 in the form of continuous tubing 2 which is expanded by gas (e.g., air) supplied through inlet 3, and is drawn vertically down from the die and through a zone of limiting cross-section defined generally by an open-ended porous-walled cylinder 4, preferably of porous metal, which is vertically (coaxially) aligned with the extrusion orifice and which terminates at its lower end a short distance above the surface of quench bath 5 of water or other suitable liquid coolant, into which the tubing is continuously drawn from the zone of limiting cross-section. The quenched tubing is converged between nip rolls 6 which are also vertically aligned in the bath with the annular die. The converged tubing is then guided from the bath over idler roll 7, and is passed over and between squeeze rolls 8 to remove excess bath liquid, after which it is suitably dried, slit and/or otherwise processed and collected on means not shown. An overflow weir 16 is provided to facilitate non-turbulent circulation of fresh water introduced into the bath 5 through inlets 17.

The critical feature of this invention resides in the maintenance of a stable body or bubble of gas within the freshly extruded tubing while the tubing is still in the plastic state, i.e., at a temperature above its stick temperature. Referring to FIGURE 2, this is accomplished by (1) provision of a zone of limiting cross-section, which in the preferred embodiment comprises an external (with respect to the tubing) open-ended porous metal cylinder 4 mounted concentrically below the annular die orifice and terminating from $1/16''$ to $2''$ above the liquid level of the quench bath; and (2) by an adjustable head of liquid 9 maintained in the tubing at a level substantially at the liquid level of bath 5. Liquid is introduced into the interior of the inflated tubing through an inlet line 10 and its level is adjusted by means of a liquid level probe 11 positioned in the extruded tubing which exerts its action, responsive to changes in the level of liquid in the tubing, on a solenoid valve 12 in the liquid inlet line. Compressed air is introduced in the porous cylinder through an air inlet 13. The air thus introduced is forced through the pores of the rings so as to form a thin air layer 14 between the ring surface and the downwardly extruded tubing. This thin air barrier keeps the tubing out of contact with the porous ring surface and serves to form and stabilize the tubing to its ultimate desired form. By the proper adjustment of the water level inside the tubing, the bubble pressure is maintained so as to just force the tubing against the air barrier 14 and to permit proper convergence at the nip rolls 6. In essence, this step of passing the film through the external porous ring while maintaining it out of contact with the ring surface by means of a thin air barrier serves the sole purpose of forming and stabilizing the tubing to its desired dimensions. It does not serve to cool the tubing to any appreciable extent. The temperature of the tubing upon entering the quench bath is substantially still above the stick temperature of the polymer and thus the desired rapid quenching action is effected on the tubing. In the case where the polymer is extruded at a particularly high temperature or is extruded at an extremely rapid rate, it may be necessary to supply coolant through the external porous ring structure in order to prevent bubble formation in the extruded tubing or the overheating of the external porous ring. This is accomplished by providing a tubular heat-exchanger 18 in thermal contact with the walls of cylinder 4 through which heat-exchange fluid may be circulated.

The porous-walled cylinder is preferably fabricated of a sintered metal, e.g., sintered bronze or the like. Instead of sintered metal, other gas pervious structures may be employed, such as for example aggregates of small metal balls point-welded or soldered together so as to provide through-going air passages relatively uniform in both size and distribution. Or sintered wire matrices in a variety of forms, as well as pervious metal-ceramic composites characterized by thermal conductivities approaching those of metals may be employed. In a typical apparatus, the porous-walled cylinder was fabricated from $1/2''$ thick sintered bronze metal having a porosity of about 27% on the volumetric basis which permitted the passage of about 5 cubic feet per minute per square foot of heat-exchanger area of air at 5 pounds per square inch gauge differential across the porous wall.

The following specific examples will serve to further illustrate the principles, practice and advantages of the invention.

Example 1

Polyethylene having an annealed density of 0.92 gram per cc. and a crystalline melting point of 112° C. was extruded at a temperature of 200° C. through a 1″ extruder (National Rubber Machinery Co.) having a barrel opening (L/D) of 18, equipped with a Robbins 2″ die, said die being maintained at a temperature of 200° C. and in a manner described hereinbefore, downwardly extruded into a quench bath, the temperature of which is maintained at 29° C. The film was drawn through the nip rolls at a speed of 10 feet per minute. The air pressure to the external porous ring was maintained at between 3–5 pounds per square inch gauge. The outside diameter of the extruded tubing was 4″. The diameter of the external porous ring was 4″ inside diameter and $4\frac{1}{2}''$ outside diameter. The external porous ring was located at a distance of $\frac{1}{2}''$ above the water level. The film tubing thus formed was essentially wrinkle-free and exhibited substantially balanced physical properties.

Example 2

In the apparatus described in Example 1, both polyethylene having an annealed density of 0.92 gram per cc. and a crystalline melting point of 112° C., and polyethylene having an annealed density of 0.95 gram per cc. and a crystalline melting point of 133° C. were downwardly extruded and rapidly quenched in the cooling bath. In the case of the first-named polyethylene, the tubing was extruded at a temperature of 200° C. The air pressure to the external porous ring was 4 pounds per square inch gauge; the film was extruded at a rate of 126 grams per minute. In the case of the second-named polyethylene, the tubing was extruded at a temperature of 250°–260° C. and was drawn downwardly into the nip rolls at a speed of 7.5 feet per minute. The air pressure to the external porous ring was 5 pounds per square inch gauge. The film was extruded at a rate of 53 grams per minute. Again satisfactorily quenched wrinkle-free tubing possessing substantially balanced physical properties was obtained.

Example 3

A polyvinyl chloride formulation consisting of 93.5% polyvinyl chloride (Dow 111–4—Dow Chemical Co.), 3.5% dibutyl tin thioester (Thermolite 31—Metal Thermite Co.), and 3% calcium stearate was extruded at a temperature of 190° C. through a 1″ extruder (National Rubber Machinery Co.), having a barrel opening (L/D) of 18, equipped with a Robbins 2″ die, said die being maintained at a temperature of 200° C., and in a manner described hereinbefore downwardly extruded into a quench bath, the temperature of which is maintained at 20° C. The film was drawn through the nip rolls at a speed of 13.5 feet per minute. The air pressure to the external porous ring was maintained at between 3–5 pounds per square inch gauge. The outside diameter of the extruded tubing was 4″. The diameter of the external porous ring was 4″ inside diameter and $4\frac{1}{2}''$ outside diameter. The external porous ring was located at a distance of $\frac{1}{2}''$ above the water level. The film tubing thus formed was essentially wrinkle-free and exhibited substantially balanced physical properties.

The process of the present invention, featuring the essential and novel step of bringing the extruded and inflated tubing into contact with an air barrier emitted through an external porous ring structure, allows for the rapid quenching of an essentially wrinkle-free thermoplastic film tubing exhibiting a substantial degree of balance in physical properties and excellent clarity. It now makes feasible the preparation on a commercial scale of tubing prepared from such polymers as polyethylene terephthalate which have heretofore been able to be successfully extruded only in the form of a flat sheet. The essential advantages of being able to prepare such a film in the form of tubing are as follows:

(1) Better balanced physical properties (in the extrusion of flat sheets the step of drawing the extruded film downwardly through air to a quench drum usually results in the film being drawn more in one direction than the other thus causing an imbalance of physical properties).

(2) The tubing may be oriented continuously after quenching over a circular die stretching apparatus, thus eliminating the need for costly tenter frames.

(3) There exist many direct uses for film in the form of tubing, particularly in the packaging field.

(4) Production of film in tubular form reduces waste.

An additional advantage of considerable commercial importance is that a range of tubing diameters may be produced using a single extrusion die simply by using in each case a porous-walled cylinder corresponding to the diameter of the tubing desired.

I claim:

1. A method for the manufacture of continuous thermoplastic thin-walled tubing which comprises continuously extruding molten organic thermoplastic material downwardly in the form of tubing of circular cross-section, continuously advancing said tubing downwardly through a zone of limiting cross-section, expanding said tubing in said zone to the limiting cross-section by the pressure of gas on the interior of the tubing while maintaining the tubing above its stick temperature, continuously advancing said tubing without further expansion and at a temperature above its stick temperature downwardly into a bath of liquid coolant maintained at a temperature effective to rapidly quench said tubing, continuously converging the quenched tubing in said bath to form a flattened tubing, and maintaining a head of liquid in said tubing below the zone of limiting cross-section, the level of said head of liquid being adjusted to maintain the gas in said tubing at a pressure effective to maintain the tubing in said zone of limiting cross-section at said limiting cross-section.

2. A method for the manufacture of continuous thermoplastic thin-walled tubing which comprises continuously extruding molten organic thermoplastic material downwardly in the form of tubing of circular cross-section, continuously advancing said tubing downwardly through a gas pervious cylinder, expanding said tubing in said cylinder to a predetermined ultimate diameter by the pressure of gas on the interior of the tubing, maintaining the outer surface of the expanded tubing out of contact with said cylinder by means of gas under pressure supplied substantially uniformly between said outer surface and said cylinder, maintaining the tubing as it passes through said cylinder at a temperature above the stick temperature thereof, continuously passing said tubing at a temperature above its stick temperature from said cylinder downwardly into a bath of liquid coolant maintained at a temperature effective to rapidly quench said tubing, continuously converging the quenched tubing in the bath to form a flattened tubing, and maintaining a head of liquid in said tubing below said cylinder, the level of said head of liquid being adjusted to maintain the gas in said tubing at a pressure effective to maintain the tubing at said predetermined diameter as it passes through said cylinder and into the bath.

3. The process of claim 2 wherein the thermoplastic organic material is polyethylene.

4. The process of claim 3 wherein the polyethylene is linear polyethylene.

5. Apparatus for the extrusion of thin-walled tubing of thermoplastic organic material comprising in combination, an extrusion die having an annular extrusion orifice, an open-ended cylinder having a gas pervious wall and disposed below and in coaxial alignment with said annular extrusion orifice, a bath of liquid coolant disposed below and in close proximity to said cylinder, means for converging tubing in said bath, means for continuously drawing tubing extruded from said orifice downwardly through said cylinder and said bath and said means for converging the tubing, means for supplying gas under pressure to the interior of said tubing as it is extruded, means for maintaining a head of liquid in said tubing, means for adjusting the level of said liquid responsive to changes in the pressure of said gas in said tubing whereby to maintain the pressure of said gas in said tubing substantially constant, and means for uniformly supplying gas under pressure through the gas-pervious wall of the cylinder.

References Cited in the file of this patent

UNITED STATES PATENTS

| | | |
|---|---|---|
| 2,047,554 | Fischer | July 14, 1936 |
| 2,387,886 | Devol | Oct. 30, 1945 |
| 2,433,937 | Tornberg | Jan. 6, 1948 |
| 2,450,457 | Grotenhius | Oct. 5, 1948 |
| 2,461,975 | Fuller | Feb. 15, 1949 |
| 2,519,375 | Jargstorff et al. | Aug. 22, 1950 |
| 2,541,064 | Irons | Feb. 13, 1951 |
| 2,632,205 | Fitz Harris | Mar. 22, 1953 |
| 2,641,022 | Kress | June 9, 1953 |
| 2,698,463 | Conwell et al. | Jan. 4, 1955 |
| 2,814,071 | Allen et al. | Nov. 26, 1957 |

FOREIGN PATENTS

| | | |
|---|---|---|
| 714,915 | Great Britain | Sept. 8, 1954 |